Jan. 5, 1932. L. E. WOOD 1,839,436
METHOD OF PRODUCING COMPOSITE ARTICLES
Original Filed Nov. 4, 1924    3 Sheets-Sheet 1

Inventor
Lloyd E. Wood
by [signature] Att'y

Jan. 5, 1932.    L. E. WOOD    1,839,436
METHOD OF PRODUCING COMPOSITE ARTICLES
Original Filed Nov. 4, 1924    3 Sheets-Sheet 2

Inventor
Lloyd E. Wood
by  [signature]  Att'y

Jan. 5, 1932.  L. E. WOOD  1,839,436
METHOD OF PRODUCING COMPOSITE ARTICLES
Original Filed Nov. 4, 1924   3 Sheets-Sheet 3
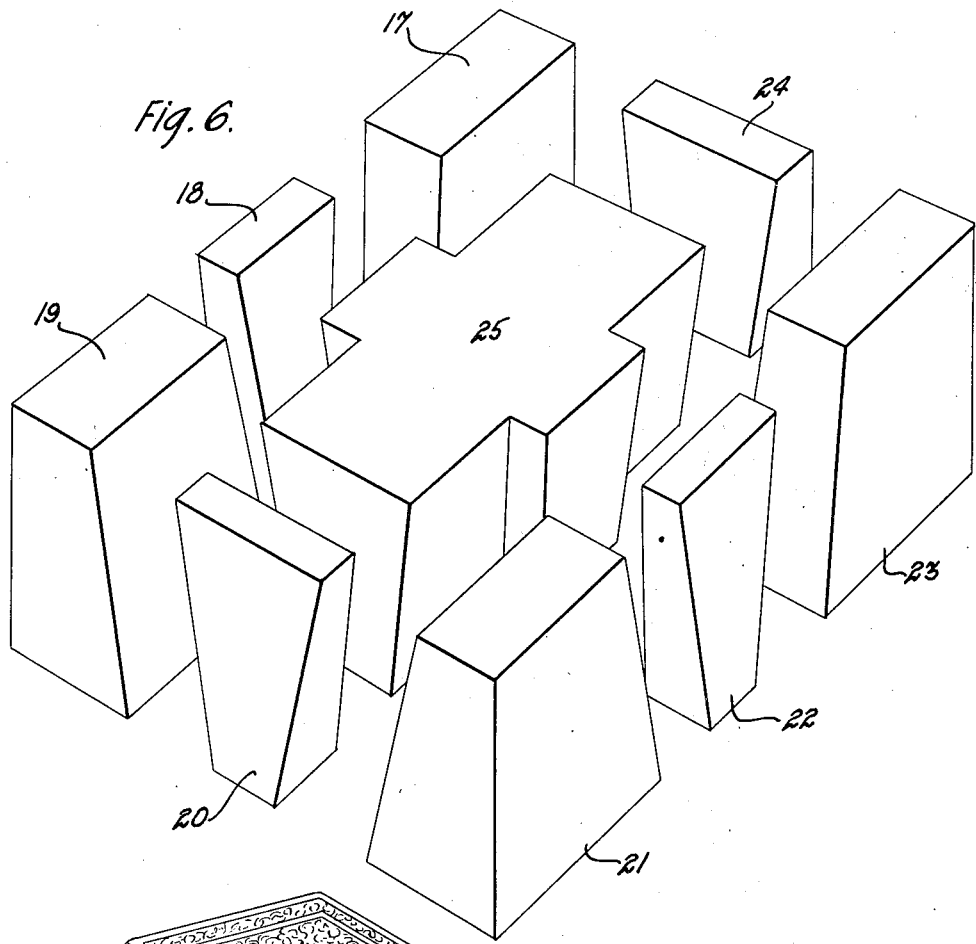
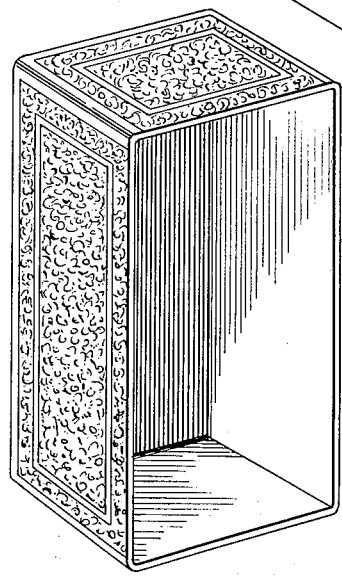
Inventor
Lloyd E. Wood
by  Att'y.

Patented Jan. 5, 1932

1,839,436

UNITED STATES PATENT OFFICE

LLOYD EMMONS WOOD, OF CHICAGO, ILLINOIS, ASSIGNOR TO WESTERN ELECTRIC COMPANY, INCORPORATED, OF NEW YORK, N. Y., A CORPORATION OF NEW YORK

METHOD OF PRODUCING COMPOSITE ARTICLES

Original application filed November 4, 1924, Serial No. 747,770. Divided and this application filed March 28, 1928. Serial No. 265,341.

This invention relates to a method of producing composite articles and is a division of my copending application, Serial No. 747,770, filed November 4, 1924, which has become Patent 1,802,101.

The primary object of the invention is to provide an improved and inexpensive method of and apparatus for expeditiously producing composite articles of uniform shape and structure.

In accordance with the general features of the invention, the improved method of molding composite articles consists in forming a plurality of blanks of various predetermined shapes from a sheet of fibrous material treated with a substance, such as a phenolic condensation product, which is curable by heat and pressure. A plurality of blanks so formed are superimposed one upon another and extending portions thereof are overlapped to conform to the shape of the article desired, after which the individual blanks or laminations are coalesced by curing the resin, the curing being effected by subjecting the assembled blanks to a predetermined heat and pressure uniformly distributed throughout the whole surface thereof.

An improved mold embodying the features of the invention and by means of which the improved method may be practiced comprises a hollow die block provided with removable finishing plates of a contour conforming to the shape of the article to be molded. Cooperating with the die block is a multi-section die or compression member comprising a plurality of wedge-like sections and a central cross-shaped member designed so that when the wedge-like members are placed in position and the cross-shaped member inserted, a pressure exerted upon the cross-shaped member will be distributed uniformly in all directions within the die block.

Other features of the invention will become apparent from the following detailed description, reference being had to the accompanying drawings which illustrate several differently shaped blanks which may be used in the production of a composite hollow article or container and a preferred form of mold embodying the invention and by means of which the improved method may be practiced.

In the accompanying drawings,

Fig. 6 is a perspective view of the component sections of the die;

Fig. 9 is a perspective view of the finished article.

The invention is herein illustrated and described in connection with the production of composite hollow articles or containers from laminations of fibrous material. It will be understood, however, that the novel features of the invention are capable of other applications within the scope of the appended claim.

Figure 1:
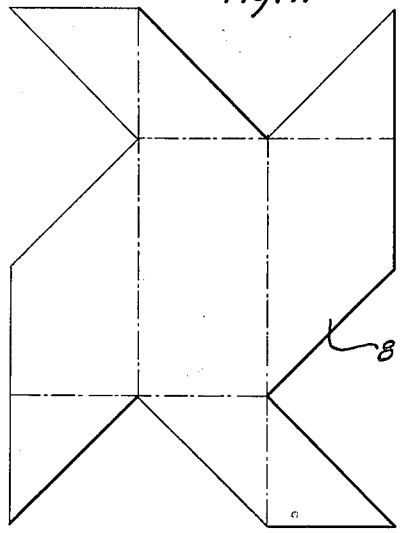
Figs. 1 and 2 are developed plan views of two differently shaped blanks for use in the production of a hollow article or container.
Figure 2:
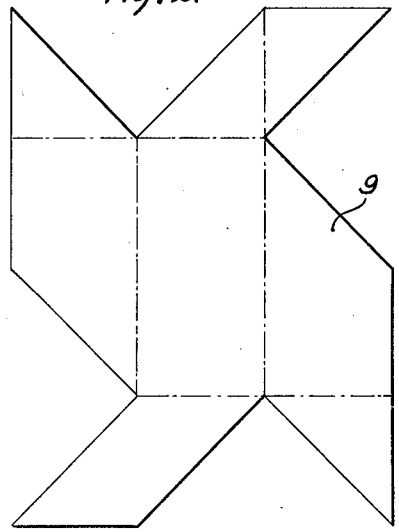
Figure 4:
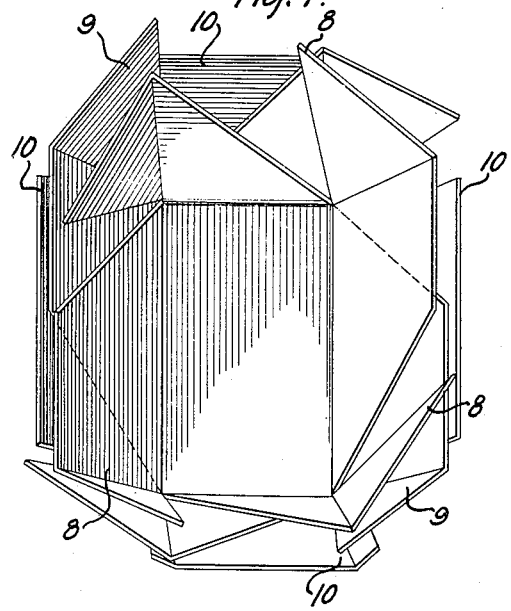
Fig. 4 illustrates the manner in which the blanks are arranged before they are inserted in the die block to be molded.
Figure 3:
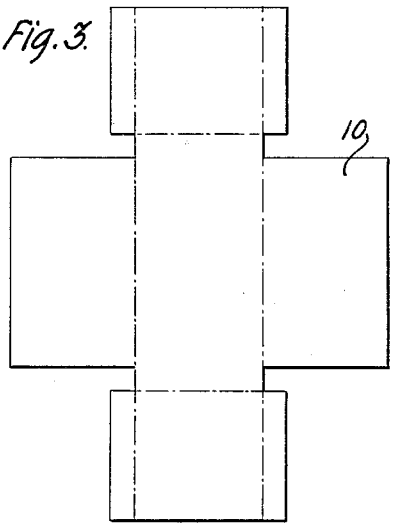
Fig. 3 is a developed plan view of a still differently shaped blank which may be used to form the outside lamination of the article.
Figure 5:
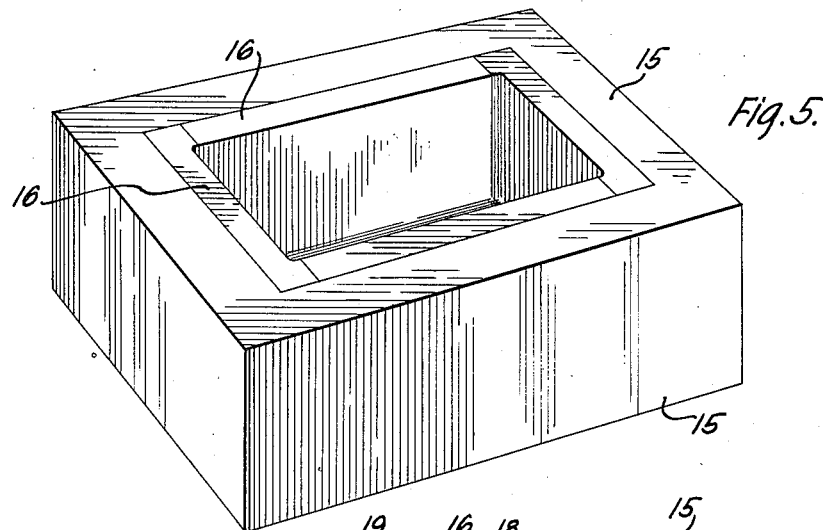
Fig. 5 is a perspective view of the die block with the removable finishing plates mounted therein.
Figure 7:
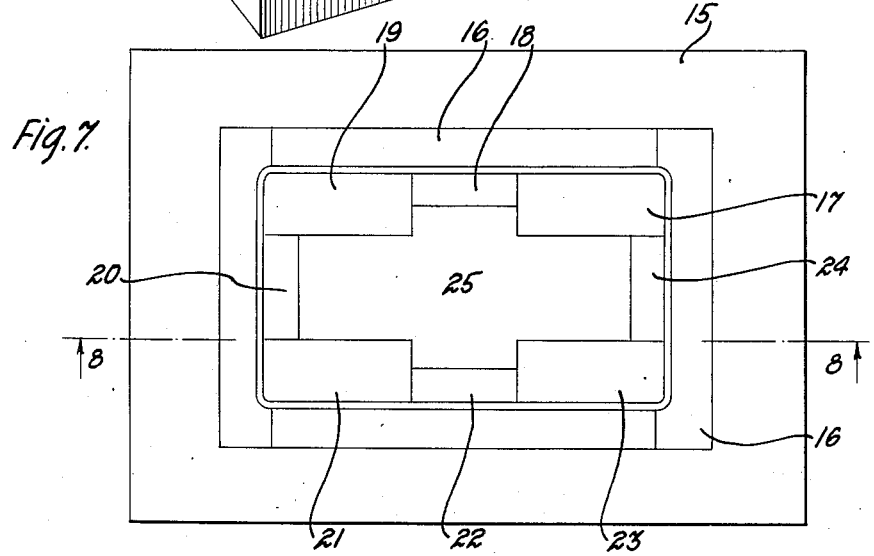
Fig. 7 is a plan view of the die block, the finishing plates and the multi-section die with the article being molded shown between the finishing plates and the outer walls of the die.
Figure 8:
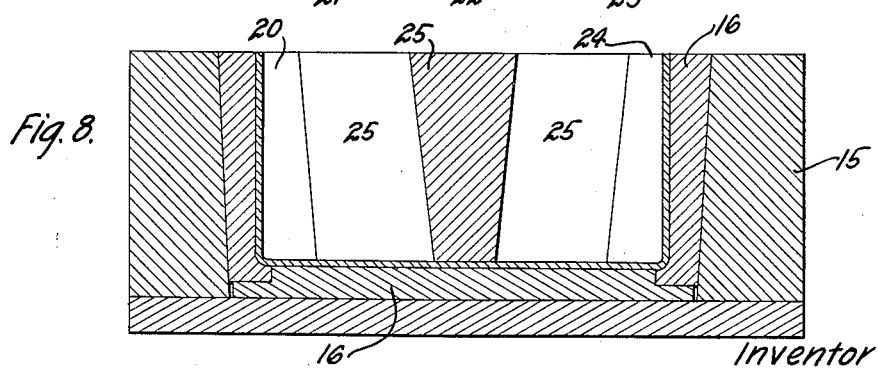
Fig. 8 is a sectional view taken on line 8—8 of Fig. 7.

Referring now more particularly to the accompanying drawings in which like reference numerals designate corresponding parts throughout the several views, a plurality of blanks 8, 9 and 10 are formed from a sheet of fibrous material and are so shaped that when folded along the lines shown in dot and dash in Figs. 1, 2 and 3, they assume a box-like shape without any portions thereof overlapping. The blanks are arranged, as shown in Fig. 4, with right blanks 8 and left blanks 9 adjacent one to the other so that the junction of the folded portions of successive blanks will not coincide. The blanks 8 and 9 (Figs. 1 and 2) are used for forming the inner laminations of the hollow article and the blank 10 (Fig. 3) is used for forming the outer lamination of the article. The blanks may be made of any suitable sheet material but good results may be obtained by employing canvas in the blanks 8 and 9 and paper in the blank 10. All of the blanks are impregnated or treated in any suitable manner with a material, such as a phenol-formaldehyde resin, or other synthetic resinous material which can be rendered both infusible and insoluble by the application of heat and pressure. The outside face of the paper blank is further treated with the curable resin by applying thereto a plastic material comprising a synthetic resin and a suitable filler so as to form a somewhat thick coating on the outside. The sheet material may be treated with the synthetic resin when in the form of a large sheet or the individual blanks after being cut out may be so treated.

After the article has been built up from the blanks or laminations in the manner described, it is molded by means of the improved mold which will now be described.

Referring now to Figs. 5 to 8, inclusive, which illustrate one specific form of a molding apparatus embodying the features of the invention, the reference numeral 15 designates a die block or matrix of the size and contour of the article to be molded. The die block 15 is lined with a plurality of removable finishing plates 16, the finishing surfaces of which may be etched with any suitable configuration or design, preferably a design to imitate pebble grained leather. Cooperating with the die block is a multi-section die comprising a plurality of wedge-like sections 17 to 24, inclusive, and a central cross-shaped member 25, all of which are so constructed and arranged that when the die sections 17 to 24 are placed in position and the central cross-shaped member 25 is inserted and a downward pressure applied thereto, the pressure is distributed uniformly in every part of the die block.

The hollow article is completed through the curing of the synthetic resin. This may be accomplished by placing the laminations which have been arranged in the manner described, and as shown in Fig. 4, inside of the die block 15 after the finishing plates 16 have been inserted therein. The die block is heated either before or after the laminations are placed in position therein and as soon as the laminations have been heated sufficiently to render them plastic and compressible, the wedge-like die sections 17 to 24 are first placed in position within the interior of the folded laminations and thereafter the central die section 25 is inserted and a downward pressure is applied thereto by any suitable means. The improved construction and arrangement of the die sections insures a uniform distribution of the pressure upon all sides of the article whereby uniform thickness and physical characteristics in the walls of the finished article are secured. Simultaneous with the application of pressure, the entire mold is heated to the temperature that is required to change the material with which the laminations are treated into the final condensation product.

The temperature and pressure and the duration thereof may be varied considerably, but uniformly good results may be obtained by employing a pressure of about 1500 pounds per square inch and a temperature of 350° F. for a period of about ten minutes. When the article has been completely cured and cooled it is removed by first removing from the die block all of the assembly, including the finishing plates, the article and the die, and then removing the die from the interior of the hollow article by first withdrawing the central die section 25 and thereafter removing the other die sections one at a time. By removing the finishing plates with the hollow article in this manner the danger of injury to the finish due to frictional contact with the side walls of the die block is avoided.

An article produced by the above described method and apparatus may be used for many purposes. The particular article illustrated in the drawings (Fig. 9) may be used as a carrying case for an audiphone or deaf-set.

Although the invention is herein illustrated and described in connection with one specific embodiment thereof, it is obvious that the novel features of the invention are capable of other applications within the scope of the appended claim.

What is claimed is:

A method of producing a hollow article, which comprises forming from sheet material impregnated with a phenolic condensation product, a plurality of blanks of identical contour and designed so that when superposed in reversed relationship, one of the blanks has overlapping portions with respect to another of the blanks, superposing a plurality of such blanks with each blank disposed in reversed relationship with respect to an adjacent blank, folding the blanks so that a uniform number of laminations exist throughout the folded structure, and then coalescing the blanks by subjecting them to heat and pressure to effect a curing of the condensation product and complete the formation of the article.

In witness whereof, I hereunto subscribe my name this 16th day of March, A. D. 1928.

LLOYD EMMONS WOOD.